US 6,565,122 B1

(12) United States Patent
Hansen

(10) Patent No.: US 6,565,122 B1
(45) Date of Patent: May 20, 2003

(54) RETRACTABLE MUD FLAP ASSEMBLY

(76) Inventor: Reginald G. Hansen, 6924 N. Williams Rd., Janesville, WI (US) 53545

( * ) Notice: Subject to any disclaimer, the term of this patent is extended or adjusted under 35 U.S.C. 154(b) by 0 days.

(21) Appl. No.: 10/134,964

(22) Filed: Apr. 30, 2002

(51) Int. Cl.[7] ............................................. B62D 25/18
(52) U.S. Cl. .................................... 280/851; 298/15 G
(58) Field of Search .......................... 49/197, 198, 199; 280/851, 848, 154, 43.2; 298/1 SG

(56) References Cited

U.S. PATENT DOCUMENTS

| | | | | |
|---|---|---|---|---|
| 2,430,729 A | * | 11/1947 | Negri | 49/197 |
| 2,721,760 A | * | 10/1955 | Lapham | 298/1 SG |
| 2,857,200 A | * | 10/1958 | Hoppesch | 298/1 SG |
| 2,944,810 A | * | 7/1960 | Stuettig et al. | 49/197 |
| 2,995,634 A | * | 8/1961 | Richmond | 49/197 |
| 3,310,344 A | * | 3/1967 | Beintum et al. | 298/1 SG |
| 3,507,513 A | * | 4/1970 | Bohrer | 280/851 |
| 3,582,109 A | * | 6/1971 | Moore | 280/851 |
| 3,802,739 A | * | 4/1974 | Knyszel et al. | 298/1 SG |
| 4,843,972 A | * | 7/1989 | Kabilka et al. | 280/43.2 |
| 5,582,431 A | * | 12/1996 | Anderson | 280/851 |

FOREIGN PATENT DOCUMENTS

JP          1064573          * 12/1980

* cited by examiner

Primary Examiner—Brian L. Johnson
Assistant Examiner—Bryan Fischmann

(57) ABSTRACT

A retractable mud flap assembly for being able to retract the mud flaps when the box of the dump truck is raised. The retractable mud flap assembly includes a housing having front, top, side, and bottom walls, and also having an open back end, and a hole being disposed through the front wall with the housing being adapted to be attached to either a vehicle or a trailer above rear tires thereof; and also includes bracket members being attached to the housing for fastening the housing to either the vehicle or trailer; and further includes a mud flap support member being movably disposed in the housing; and also includes a mud flap member being attached to the mud flap support member and being movably disposed in and from the housing; and further includes an assembly for moving the mud flap support member and the mud flap member.

8 Claims, 4 Drawing Sheets

RETRACTABLE MUD FLAP ASSEMBLY

BACKGROUND OF THE INVENTION

1. Field of the Invention

The present invention relates to retractable mud flaps and more particularly pertains to a new retractable mud flap assembly for being able to retract the mud flaps when the box of the dump truck is raised.

2. Description of the Prior Art

The use of retractable mud flaps is known in the prior art. More specifically, retractable mud flaps heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,507,513; 3,582,109; 4,221,432; 2,872,211; 6,139,062; and U.S. Pat. No. Des. 282,158.

While these devices fulfill their respective, particular objectives and requirements, the aforementioned patents do not disclose a new retractable mud flap assembly. The prior art includes mud flap members being rolled up with rollers into housings.

SUMMARY OF THE INVENTION

The general purpose of the present invention, which will be described subsequently in greater detail, is to provide a new retractable mud flap assembly which has many of the advantages of the retractable mud flaps mentioned heretofore and many novel features that result in a new retractable mud flap assembly which is not anticipated, rendered obvious, suggested, or even implied by any of the prior art retractable mud flaps, either alone or in any combination thereof. The present invention includes a housing having front, top, side, and bottom walls, and also having an open back end, and a hole being disposed through the front wall with the housing being adapted to be attached to either a vehicle or a trailer above rear tires thereof; and also includes bracket members being attached to the housing for fastening the housing to either the vehicle or trailer; and further includes a mud flap support member being movably disposed in the housing; and also includes a mud flap member being attached to the mud flap support member and being movably disposed in and from the housing; and further includes an assembly for moving the mud flap support member and the mud flap member. None of the prior art includes threaded shafts which are screws for moving a mud flap member in and out of the housing.

There has thus been outlined, rather broadly, the more important features of the retractable mud flap assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new retractable mud flap assembly which has many of the advantages of the retractable mud flaps mentioned heretofore and many novel features that result in a new retractable mud flap assembly which is not anticipated, rendered obvious, suggested, or even implied by any of the prior art retractable mud flaps, either alone or in any combination thereof.

Still another object of the present invention is to provide a new retractable mud flap assembly for being able to retract the mud flaps when the box of the dump truck is raised.

Still yet another object of the present invention is to provide a new retractable mud flap assembly that is easy and convenient to attach to the box of a truck.

Even still another object of the present invention is to provide a new retractable mud flap assembly that prevents the mud flaps from breaking off when the box is tilted.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
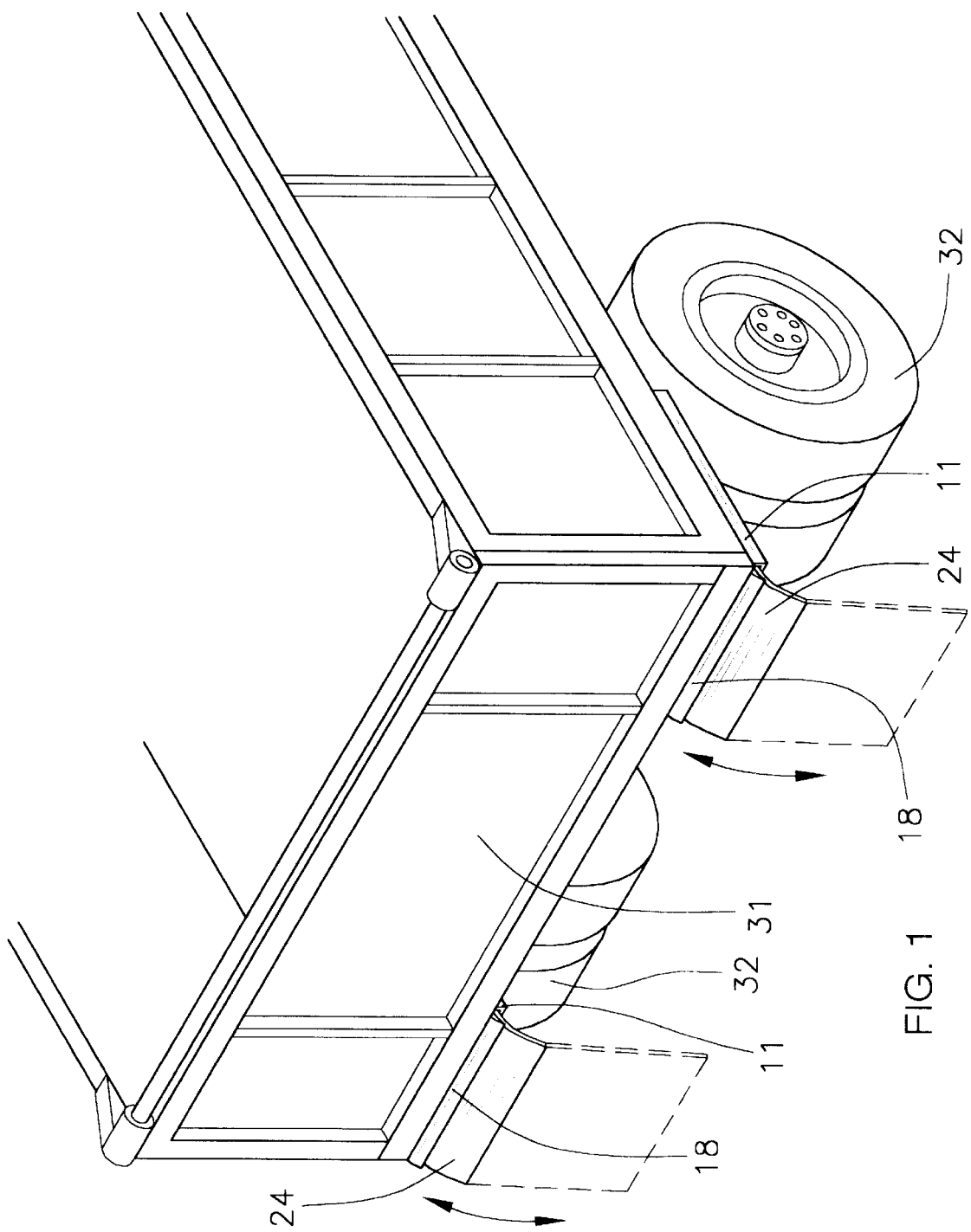
FIG. 1 is a perspective view of a new retractable mud flap assembly according to the present invention and shown in use.
Figure 2:
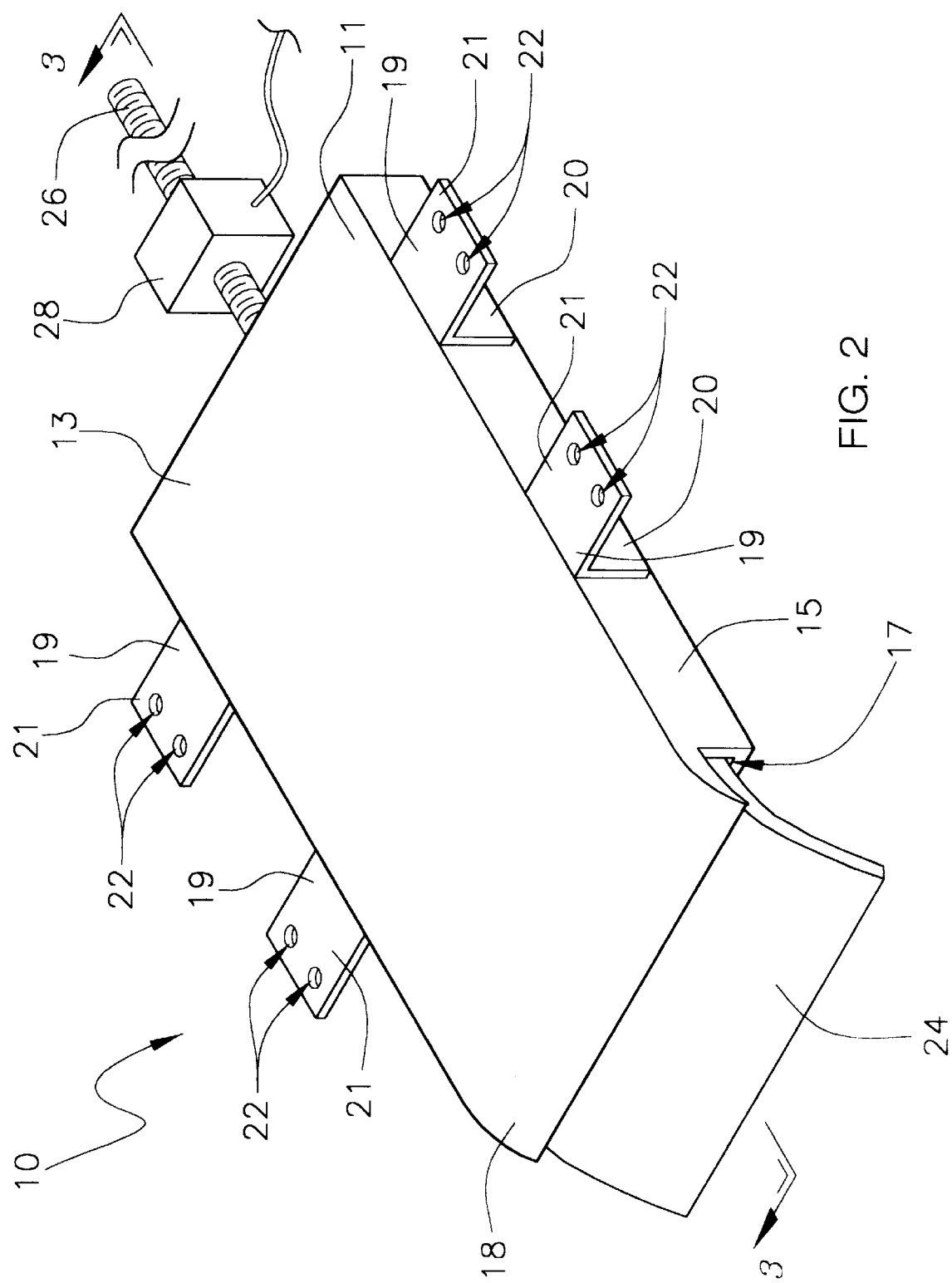
FIG. 2 is a perspective view of the present invention.
Figure 3:
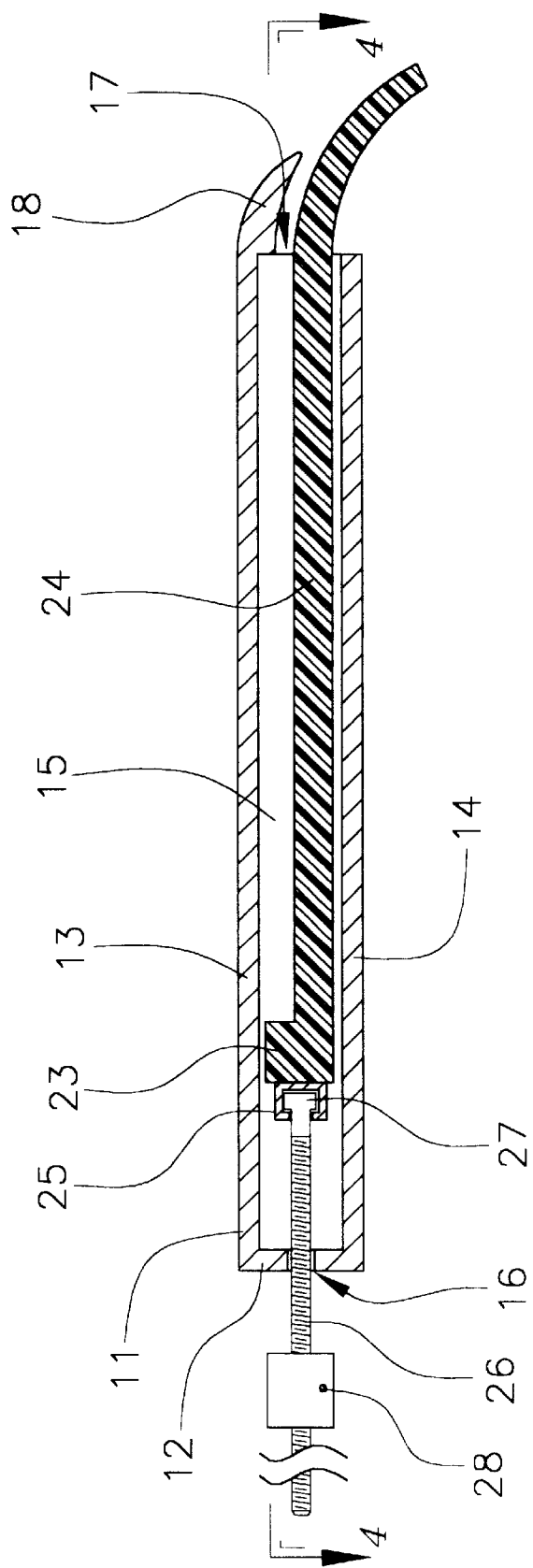
FIG. 3 is a lateral cross-sectional view of the present invention.
Figure 4:
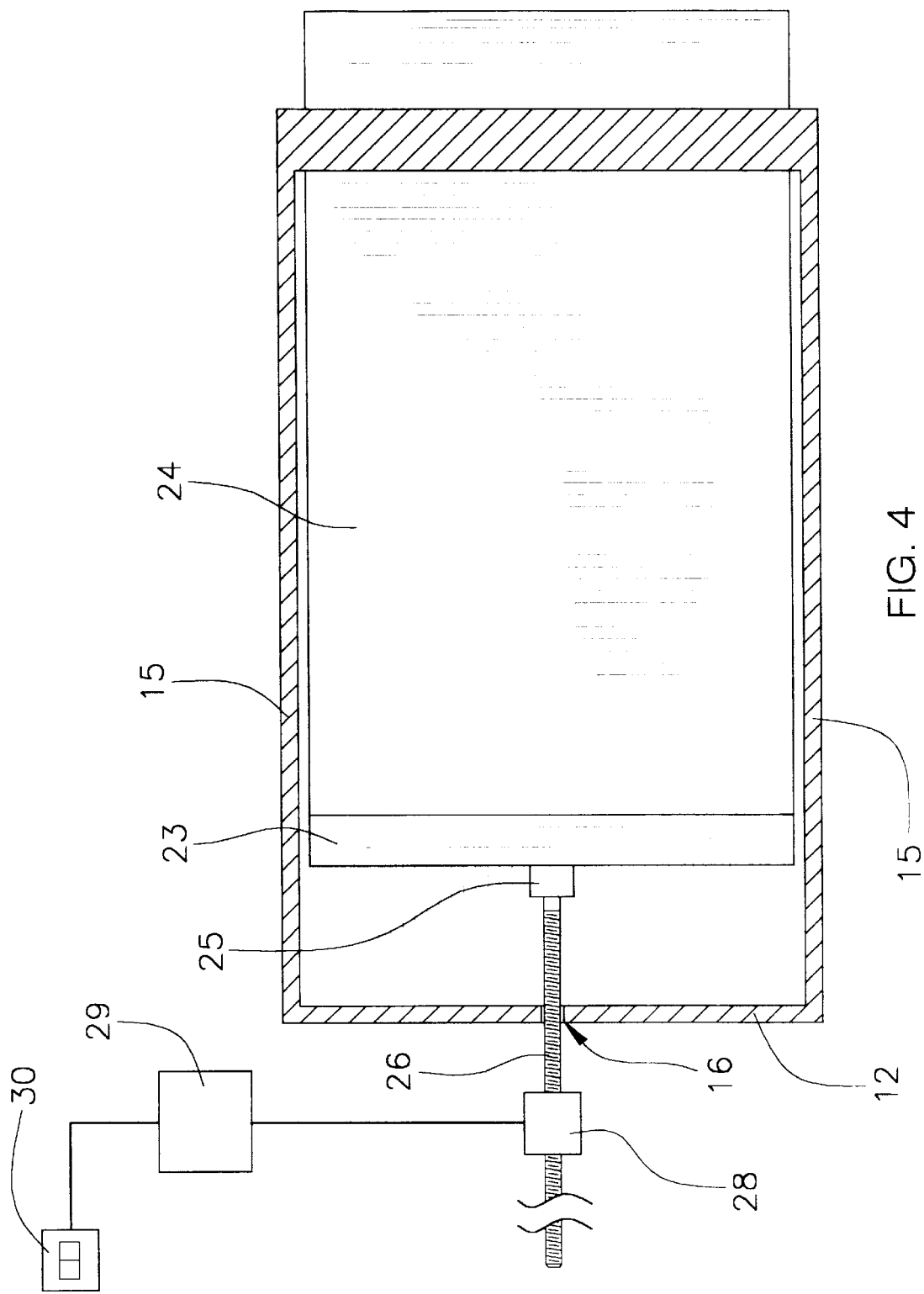
FIG. 4 is a longitudinal cross-sectional view of the present invention.

With reference now to the drawings, and in particular to FIGS. 1 through 4 thereof, a new retractable mud flap assembly embodying the principles and concepts of the present invention and generally designated by the reference numeral 10 will be described.

As best illustrated in FIGS. 1 through 4, the retractable mud flap assembly 10 generally comprises a housing 11 having front, top, side, and bottom walls 12–15, and also having an open back end 17, and a hole 16 being disposed through the front wall 12. The housing 11 is adapted to be attached to a truck box 31 above rear tires 32 thereof. The top wall 13 of the housing 11 has a downwardly curved back end portion 18 which extends outwardly beyond back ends of the side and bottom walls 14,15. The housing 11 is long, wide and thin with the top and bottom walls 13,14 being closely spaced apart.

Bracket members 19 are conventionally attached and welded to the housing 11 for fastening the housing 11 with fasteners to the truck box 31. The bracket members 19 are conventionally attached to the side walls 15 of the housing 11 with each of the bracket members 19 having a first planar portion 20 which is securely attached to a respective side wall 15 of the housing 11 and also having a second planar portion 21 which is angled relative to the first planar portion 20 and which has holes 22 being disposed therethrough for attaching the housing 11 to the truck box 31.

A mud flap support member 23 is movably disposed in the housing 11. The mud flap support member 23 is a rigid elongate support member having a length approximately equal to a width of the housing 11. A mud flap member 24 is integrally attached to the mud flap support member 23 and is movably disposed in and from the housing 11. The mud flap member 24 has a front edge which is attached to the rigid elongate support member 23 and is made of a semi-rigid rubberized material.

Means for moving the mud flap support member 23 and the mud flap member 24 includes a collar-like coupler 25 being conventionally attached and welded to the mud flap support member 23, and also includes a threaded shaft 26 being threaded in and out through the hole 16 in the front wall 12 of the housing 11 and being conventionally attached to the collar-like coupler 25, and further includes a motor 28 being conventionally attached to the threaded shaft 26 for moving the threaded shaft 26 in and out of the housing 11, and also includes a power source 29 such as a vehicle battery being conventionally connected with wires to the motor 28, and further includes a control switch 30 being conventionally connected with wires to the power source 29 and to the motor 28 for energizing the motor 28. The threaded shaft 26 has an annular flange portion 27 being disposed at an end thereof and being securely engaged to the collar-like coupler 25. The motor 28 is a two directional motor for rotating the threaded shaft 26 counterclockwise and clockwise.

In use, the user holds the control switch 30 which is generally a two-way rocker switch to one side which energizes the motor 28 to rotate the threaded shaft 26 into the housing 11 to deploy the mud flap member 24 through the open back end 17 of the housing 11. To retract the mud flap member 24 into the housing 11, the user simply depresses and holds the control switch 30 to the other side which energizes the motor 28 to rotate the threaded shaft 26 out of the housing 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the retractable mud flap assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A retractable mud flap assembly comprising:
    a housing having front, top, side, and bottom walls, and also having an open back end, and a hole being disposed through said front wall, said housing being adapted to be attached to a truck box above rear tires thereof, said top wall of said housing having a downwardly curved back end portion which extends outwardly beyond back ends of said side and bottom walls;
    bracket members being attached to said housing for fastening said housing to the truck box;
    a mud flap support member being movably disposed in said housing;
    a mud flap member being attached to said mud flap support member and being movably disposed in and from said housing; and
    means for moving said mud flap support member and said mud flap member.

2. A retractable mud flap assembly as described in claim 1, wherein said housing is long, wide and thin with said top and bottom walls being closely spaced apart.

3. A retractable mud flap assembly as described in claim 1, wherein said bracket members are attached to said side walls of said housing with each of said bracket members having a first planar portion which is securely attached to a respective said side wall of said housing and also having a second planar portion which is angled relative to said first planar portion and which has holes being disposed therethrough for attaching said housing to the truck box.

4. A retractable mud flap assembly as described in claim 3, wherein said mud flap support member is a rigid elongate support member having a length approximately equal to a width of said housing.

5. A retractable mud flap assembly as described in claim 4, wherein said mud flap member has a front edge which is attached to said rigid elongate support member and is made of a semi-rigid rubberized material.

6. A retractable mud flap assembly as described in claim 5, wherein said means for moving said mud flap support member and said mud flap member includes a collar-like coupler being attached to said mud flap support member, and also includes a threaded shaft being threaded in and out through said hole in said front wall of said housing and being attached to said collar-like coupler, and further includes a motor being attached to said threaded shaft for moving said threaded shaft in and out of said housing, and also includes a power source being connected to said motor, and further includes a control switch being connected to said power source and to said motor for energizing said motor.

7. A retractable mud flap assembly as described in claim 6, wherein said threaded shaft has an annular flange portion being disposed at an end thereof and being securely engaged to said collar-like coupler.

8. A retractable mud flap assembly as described in claim 7, wherein said motor is a two directional motor for rotating said threaded shaft counterclockwise and clockwise.

* * * * *